United States Patent [19]

Dal Cero

[11] Patent Number: 4,804,808
[45] Date of Patent: Feb. 14, 1989

[54] PRESSURE SENSING DEVICE FOR TIRES OF MOTOR VEHICLES

[75] Inventor: Giovanni Dal Cero, Piossasco, Italy

[73] Assignee: Greg di S. Greganti & C. S.a.s., Turin, Italy

[21] Appl. No.: 30,019

[22] Filed: Mar. 25, 1987

[30] Foreign Application Priority Data

Mar. 25, 1986 [IT] Italy ................................ 53186/86[U]

[51] Int. Cl.⁴ ............................................. H01H 35/24
[52] U.S. Cl. ................................. 200/61.25; 200/83 J; 200/83 S
[58] Field of Search ........................ 200/61.22–61.25, 200/81 R, 82 R, 83 R, 83 J, 83 L, 83 P, 83 Q, 83 S, 83 SA; 340/58

[56] References Cited

U.S. PATENT DOCUMENTS

| | | | |
|---|---|---|---|
| 2,520,353 | 8/1950 | Martinez del Campo et al. | 200/61.25 |
| 2,777,028 | 1/1957 | Kendall et al. | 200/83 J |
| 2,931,874 | 4/1960 | Leaman | 200/82 R X |
| 3,430,196 | 2/1969 | Dalton | 200/61.25 X |
| 3,521,231 | 7/1970 | Johnston | 340/58 |
| 3,693,149 | 9/1972 | Johnston | 200/61.25 X |
| 3,963,887 | 6/1976 | Takusagawa et al. | 200/61.25 |
| 4,286,253 | 8/1981 | Nagy | 200/61.25 X |
| 4,694,273 | 9/1987 | Franchino | 200/83 J X |

FOREIGN PATENT DOCUMENTS

1030246 6/1953 France ............................ 200/61.25

*Primary Examiner*—J. R. Scott
*Attorney, Agent, or Firm*—Sughrue, Mion, Zinn Macpeak & Seas

[57] ABSTRACT

A pressure sensing device associated with a motor vehicle tire is able to signal a lowering of the tire pressure below a minimum value or a raising of this pressure above a maximum value, these minimum and maximum values being adjustable separately.

4 Claims, 2 Drawing Sheets

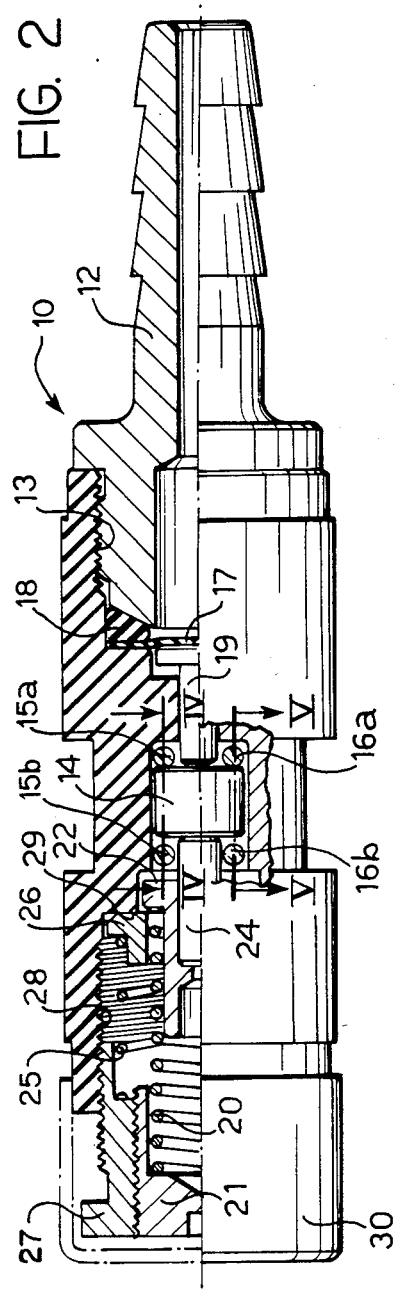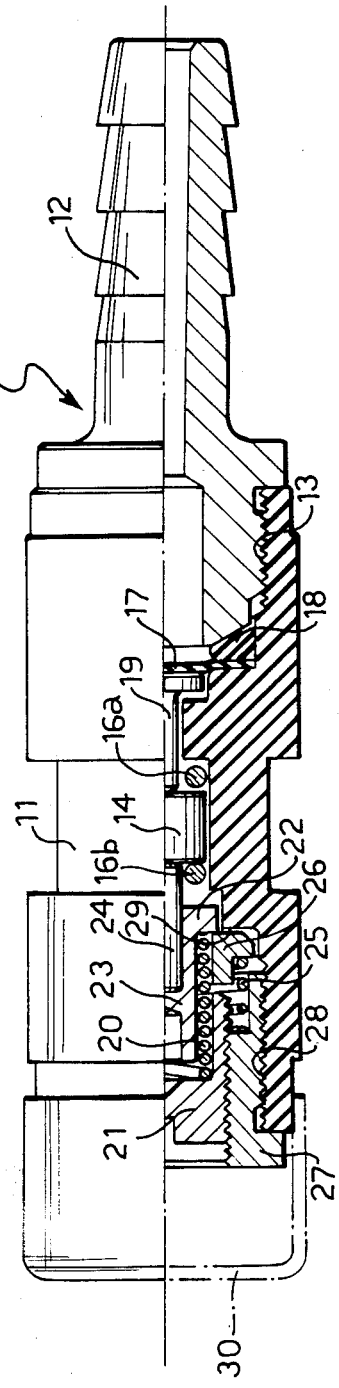

PRESSURE SENSING DEVICE FOR TIRES OF MOTOR VEHICLES

The device includes a hollow body having spaced apart pairs of fixed electrical contacts and a movable contact disposed for movement therebetween. A diaphragm divides the interior of the hollow body into a first part adapted to be in communication with the interior of a tire and a second part containing a piston engaging the diaphragm and the movable contact for moving the contact in response to the pressure. A first adjustable spring biases the movable contact toward a first limit position against the tire pressure in contact with a first pair of contacts. A second adjustable spring provides additional resistance to movement of the movable contact toward a second limit position.

The present invention relates to pressure sensing devices for motor vehicle tires, of the known type comprising:
- a hollow body,
- a contact member movable within the hollow body,
- first resilient means biasing the contact member towards a first travel limit position in which the member closes a first electrical contact,
- means for adjusting the load of the first resilient means,
- a drive piston slidable in the hollow body to push the contact member away from the first travel limit position,
- a diaphragm having its peripheral edge sealed to the wall of the chamber within the body of the device and its central part in contact with the drive piston, and
- means for putting the interior of a tire into communication with the part of the chamber of the device located on that side of the diaphragm opposite the drive piston.

Sensing devices of the aforesaid type are already used in systems for detecting the pressure of motor vehicle tire to indicate to the driver when the pressure in any one of the tire of the motor vehicle falls below a predetermined minimum value. In such known systems, when the pressure within the tire falls below a predetermined threshold, the resilient means acting on the movable contact member overcome the pressure acting on the diaphragm to cause the closure of the electrical contact. The electrical signal thus generated is fed to a radio transmitter which is mounted with the pressure sensing device on the motor vehicle wheel. The radio transmitter is connected to a device which forms part of the vehicle instrumentation and signals to the driver of the motor vehicle the fall in pressure in the tire to below the threshold value.

SUMMARY OF THE INVENTION

The object of the present invention is to provide a sensing device which is able to indicate both a lowering of the tire pressure to below the predetermined threshold value, and a raising of this pressure above a predetermined maximum value, and which also enables the separate adjustment of the two pressure thresholds at which the device acts.

In order to achieve this object, the invention provides a device of the type specified at the beginning of the present specification, characterised in that it further includes:

- a second electrical contact located so that it is closed by the movable contact member when, as a result of the thrust of the drive piston, this reaches a second travel limit position opposite the first travel limit position,
- second resilient means biasing the movable contact member away from the second travel limit position, and located so as to act only in a final portion of the travel of the movable member towards the second travel limit position, and
- means for adjusting the load of the second resilient means, which are independent of the means for adjusting the load of the first resilient means.

In a preferred embodiment, the two electrical contacts of the device are constituted by end portions of two electrical conductors, the end portions being bent essentially into J-shapes and disposed so as to define two pairs of parallel arms arranged transverse the direction of movement of the movable contact member.

Further characteristics and advantages of the invention will become apparent from the description which follows with reference to the appended drawings, provided purely by way of non-limiting example.

BRIEF DESCRIPTION OF THE DRAWINGS

FIG. 2 and 3 are two sectional views illustrating the sensing device of the invention in two different operating conditions.

DETAILED DESCRIPTION OF THE INVENTION

Figure 1:
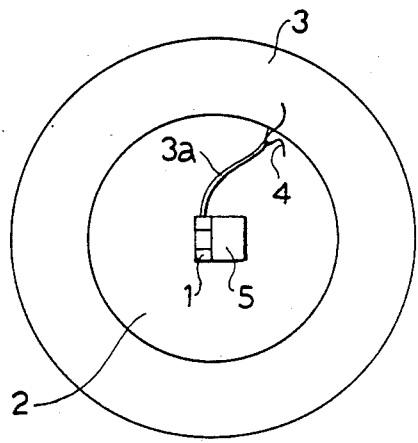
FIG. 1 illustrates schematically a pressure sensing device according to the invention mounted on a motor vehicle.

With reference to FIG. 1, a pressure sensing device according to the invention is generally indicated 1 and is mounted on a wheel 2 of a motor vehicle. The chamber within the device is connected through a tube 3a to an inflation valve 4 for the tire 3 of wheel 2, so that the interior of the tire is in communication with the chamber of the sensing device 1. The sensing device 1 also has an associated body 5 which contains a transmitter provided with a supply battery and connected to a radio receiver forming part of the instrumentation of the motor vehicle. When the sensing device 1 detects a variation in the pressure of the tire outside a pressure range lying between a predetermined minimum value and a predetermined maximum value, the radio transmitter signals this occurrence to the receiver which thus generates a corresponding signal for the driver of the motor vehicle.

The embodiment of the sensing device which is illustrated in FIGS. 2 and 3 comprises a body 10 including a main tubular member 11 and a connector member 12 connected to the tubular member 11 by a threaded coupling 13 and provided with a spigot for attachment to the end of the connecting tube 3a (FIG. 1) which puts the chamber within the pressure sensing device into communication with the interior of the tire. A movable contact member 14, which is movable between two travel limit positions, is mounted within the chamber of the tubular member 11, which is made of electrical insulating material.

Figure 4:
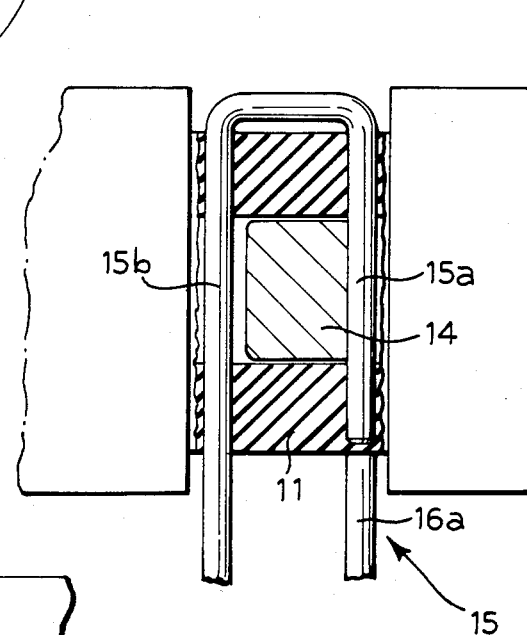
FIGS. 4 and 5 are sections taken on the lines IV—IV and V—V of FIG. 2.
Figure 5:
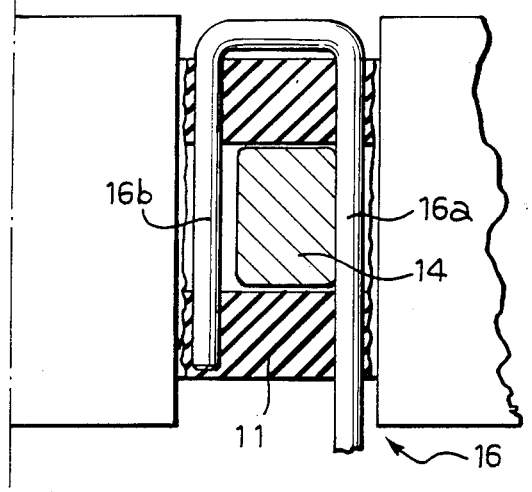

In a first travel limit position, towards the right with reference to FIG. 2, the movable member 14 closes a first electrical contact 15a, 16a, while in the second travel limit position, towards the left with reference to FIG. 3, the movable member 14 closes a second electrical contact 15b, 16b. The fixed contacts 15a, 16a and 15b, 16b are constituted by the end portions of two conductors 15, 16 as shown in FIGS. 4 and 5, which are bent into J-shapes and disposed in two parallel planes so that the arms 15a, 15b, 16a and 16b extend transverse the direction of movement of the movable member 14.

A deformable diaphragm, indicated at 17, has its peripheral edge clamped between the members 11, 12 of the body 10, with the further interposition of a rubber sealing ring 18.

In the condition in which the device is assembled on the motor vehicle wheel, the part of the chamber of the device which is located to the right of the diaphragm 17, as viewed in FIG. 2, is in communication with the interior of the tire. Consequently, as the tire pressure increases, the central part of the diaphragm 17 moves towards the left and acts on the movable member 14 through a drive piston 19, so as to tend to move it away from the travel limit position in which it closes the contact 15a, 16a. This movement is opposed by a helical spring 20 interposed between a screw 21, the function of which will be explained below, and an annular flange 22 of a bush 23. A pin 24 of insulating material is force-fitted in the bush 23 and has one end projecting axially from the bush and acting directly on the movable member 14.

Each movement of the movable member 14 towards its second end position, that is, towards the left with reference to FIG. 2 is thus opposed by the helical spring 20. When the pressure within the tire falls below a predetermined threshold, the spring 20 urges the movable member 14 to its first travel limit position, in which the electrical contact 15a, 16a is closed. The electrical signal thus generated is transmitted to the radio transmitter and from this to the receiver located within the passenger compartment of the motor vehicle.

A further helical spring 25 is mounted coaxially outside the spring 20 and is interposed axially between an abutment ring 26 and a ring nut 27. The ring nut 27 is screwed into a threaded end portion 28 of the inner wall of the tubular member 11, while the screw 21 is screwed into a central threaded hole in the ring nut 27. The threads of the screw 21 and the ring nut 27 have the same pitch. The spring 25 biases the abutment ring 26 against an annular shoulder 29 formed on the inner wall of the member 11.

When a pressure increase within the motor vehicle tire causes the movable member 14 to move towards its second travel limit position, that is towards the left with reference to FIG. 3, this movement causes a corresponding movement of the pin 24 and the bush 23. After a first portion of the travel, the annular flange 22 of the bush 23 comes into contact with the ring 26 and causes it to move away from the abutment surface 29, overcoming the action of the spring 25. Hence, in the end portion of the travel of the movable member 14 towards its second end position in which it closes the contact 15b, 16b, the movement of the member 14 is opposed by the action of both the springs 20, 25.

The member 14 reaches the travel limit position in which the contact 15b, 16b is closed at the moment the pressure of the tire reaches a predetermined maximum threshold value.

The respective minimum and maximum pressure values at which the sensing device acts can be adjusted independently by means of the screw 21 and the ring nut 27.

FIG. 2 illustrates the device with both the screw 21 and the ring nut 27 in their maximum unscrewed positions and the movable member 14 in its first travel limit position in which the contact 15a, 16a is closed. FIG. 3 illustrates the device with the screw 21 and the ring nut 27 in their fully screwed in conditions and the movable contact 14 in its second travel limit position in which the contact 15b, 16b is closed.

In practice, the device is preferably adjusted in the following manner: firstly, it is necessary for the nut 27 to be brought to its fully screwed in position so as to compress the spring 25 fully. At this point, the passage within the connector 12 is put into communication with the minimum allowable pressure. This may be done on the wheel or on a bench with a compressed air supply and a pressure regulator. The screw 21 is then adjusted so as to close the contact 15a, 16a. After this operation, the passage in the connector 12 is pressurised to a value corresponding to the maximum allowable pressure. The screw 21 then being held fast, the ring nut 27 is unscrewed until the contact 15b, 16b closes. During this operation, the calibration of the minimum pressure does not vary since the threading of the screw 21 has the same pitch as the external threading of the ring nut 27. The calibration having been effected, the end part of the device shown to the left with reference to FIG. 2 is protected by a cap 30 which is illustrated in broken outline in the drawings and which has previously been filled with an adhesive to ensure hermetic sealing and at the same time to lock the screw 21 and the ring nut 27 in their calibrated positions.

Naturally, the constructional details may be varied widely with respect to that described and illustrated purely by way of example, without thereby departing from the scope of the present invention.

I claim:

1. A pressure sensing device for motor vehicle tires comprising:

a hollow body having an internal wall defining a chamber, first and second spaced apart electrical contact means fixed within said chamber, a movable contact member movable within said hollow body between said first and second fixed contact means, first resilient means biasing said movable contact member toward a first travel limit position in which said movable contact member engages said first electrical contact means, means for adjusting the load of said first resilient means, a drive piston slidable in said hollow body to push said movable contact member away from said first travel limit position, a diaphragm having a central part and a peripheral edge located in said chamber, means sealingly securing said peripheral edge of said diaphragm to said wall of said chamber within said body of said device with said central part in contact with said drive piston, means for connecting said hollow body to a tire to communicate the interior of a tire with a part of said chamber located on a side of said diaphragm opposite said drive piston, said second electrical contact means being engaged by said movable contact member when, as a result of the thrust of said drive piston due to air pressure within said tire, said movable contact member reaches a second travel limit position opposite said first travel limit position, second resilient means biasing said movable contact member away from said second travel limit position and located so as to act only in a final portion of the travel of said movable contact member toward said second travel limit position, and means for independently adjusting the load of said second resilient means relative to the load of said first resilient means.

2. A sensing device according to claim 1, wherein said first and second electrical contacts are constituted by end portions of two electrical conductors bent essentially into J-shapes and located in two parallel, spaced-apart planes so as to define two pairs of parallel arms extending transverse to the direction of movement of said movable contact member.

3. A sensing device according to claim 1, wherein said second resilient means are constituted by a helical spring interposed between an abutment ring movable within said body of said device and an adjusting ring screwed into an end part of said body of said device, said second resilient means urging said abutment ring against an annular abutment shoulder formed on said inner wall of said body of said device, and wherein said first resilient means are constituted by a helical spring interposed between an abutment member connected operatively to said movable contact and an adjusting screw screwed into a central hole in said adjusting ring, said abutment member being shaped so as to intercept said abutment ring and move it away from said annular abutment shoulder in an end portion of the travel of said movable contact member towards its second travel limit position.

4. A sensing device according to claim 3, wherein the threads of said screw and the external threads of said adjusting ring have the same pitch.

* * * * *